Feb. 25, 1936.  A. C. GILBERT ET AL  2,031,769
KITCHEN UTILITY DEVICE
Filed Nov. 25, 1932  5 Sheets-Sheet 2

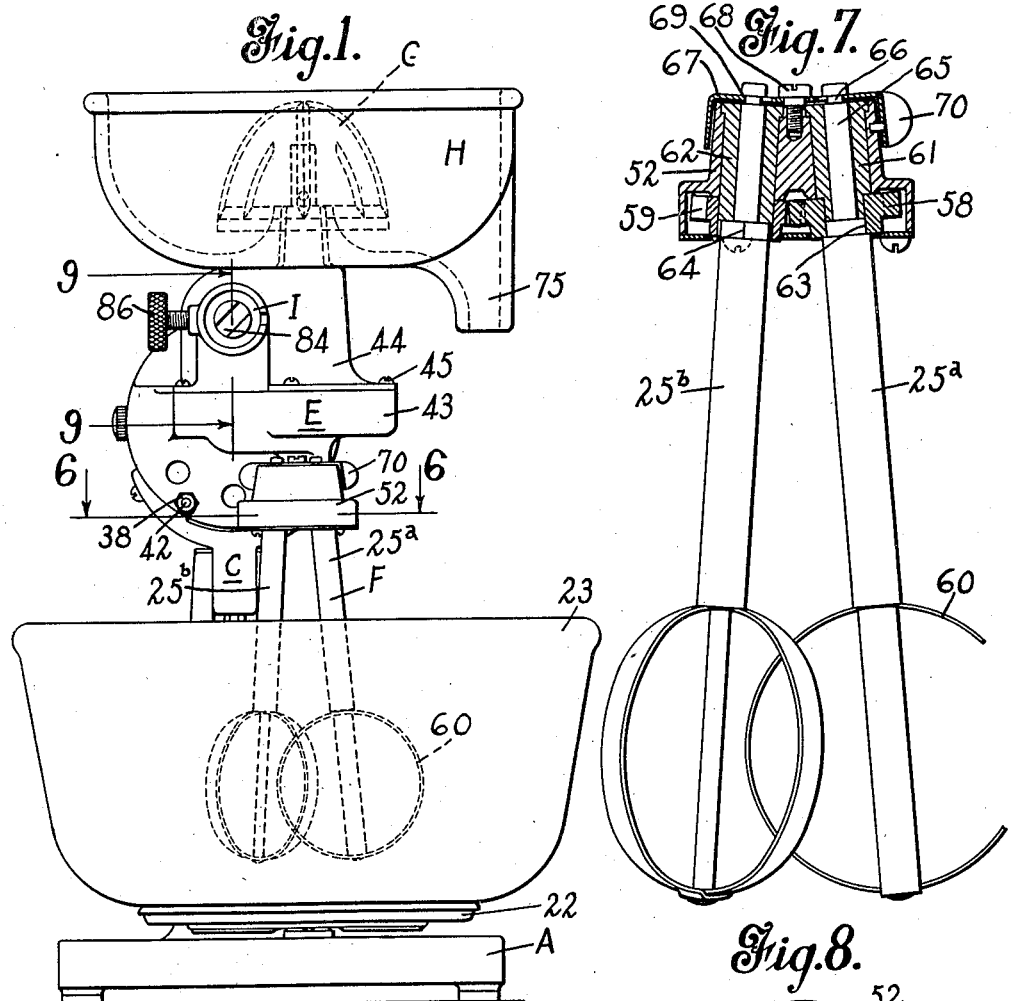
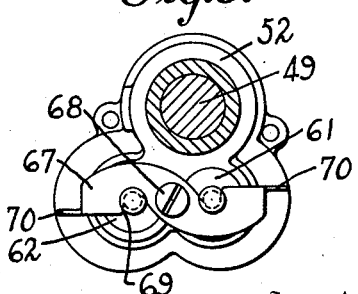
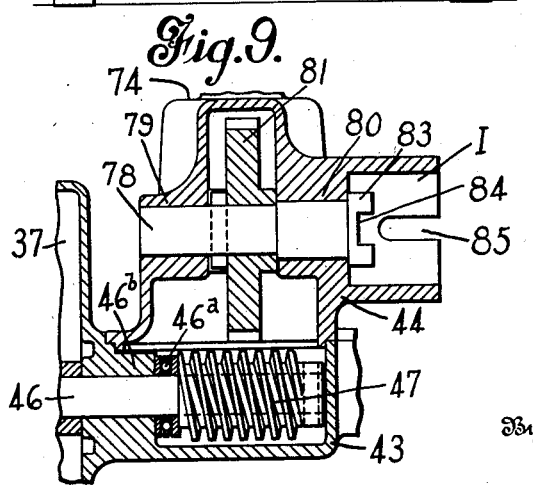

Inventors
Alfred C. Gilbert
Arthur A. Arnold
By Rollins & Bartholow
Attorneys

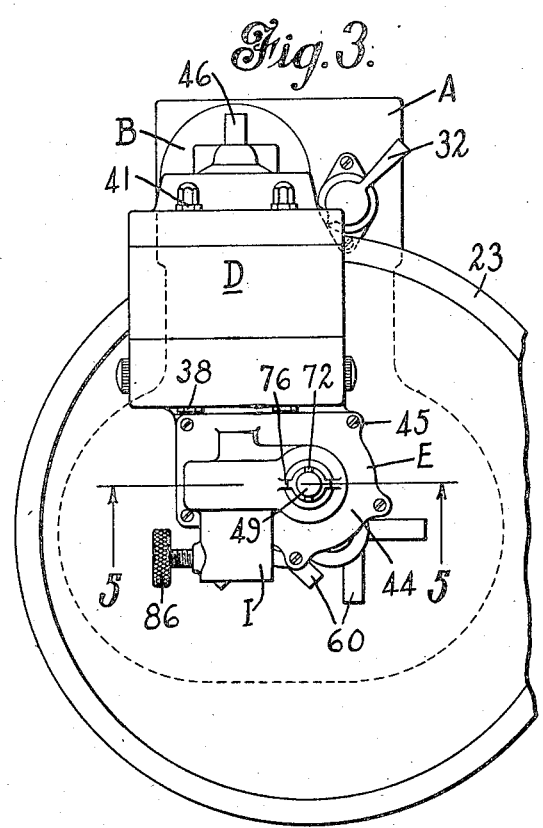

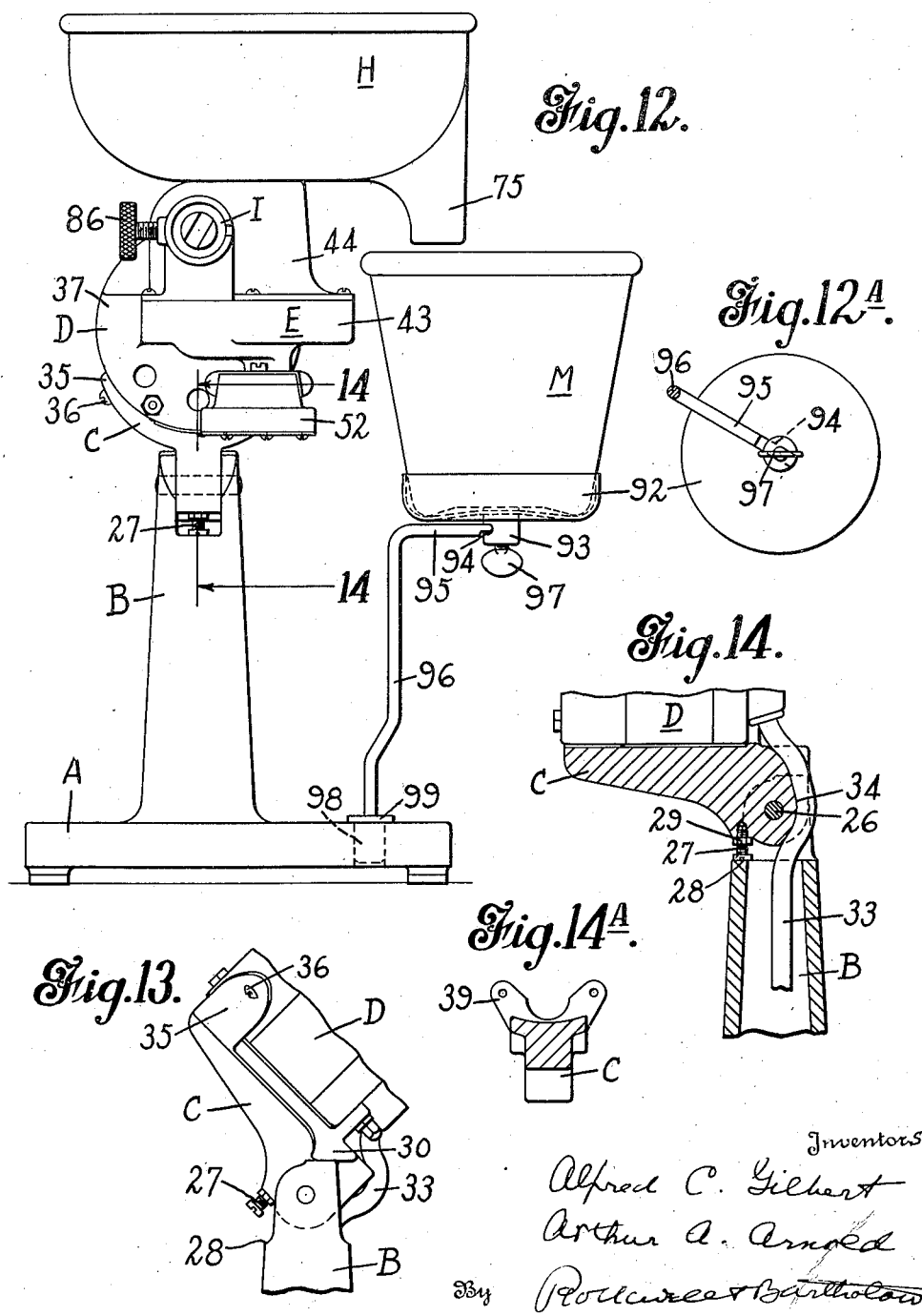

Feb. 25, 1936. A. C. GILBERT ET AL 2,031,769
KITCHEN UTILITY DEVICE
Filed Nov. 25, 1932 5 Sheets-Sheet 5
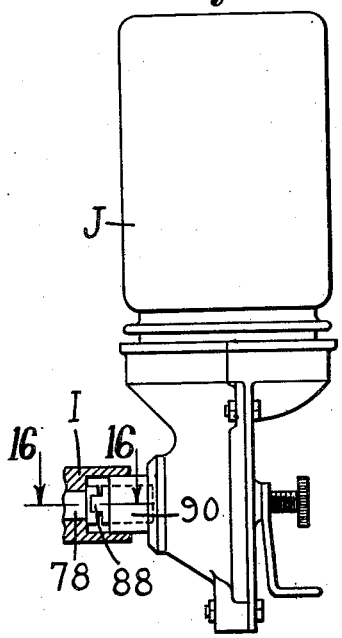
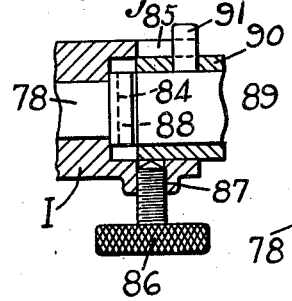
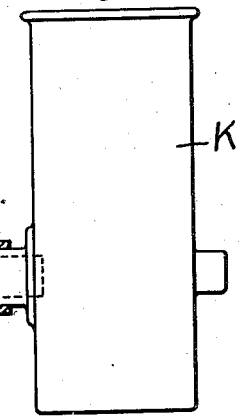
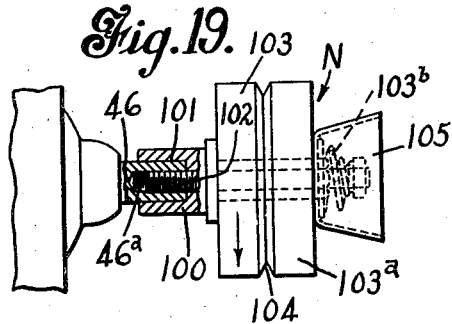
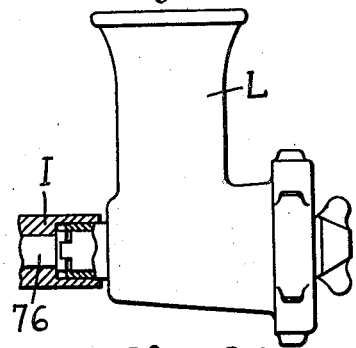
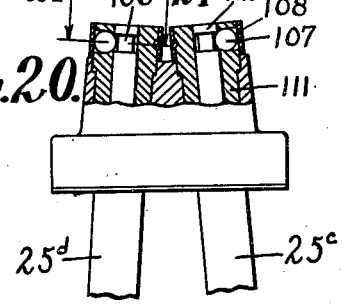
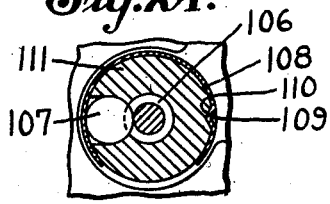

Patented Feb. 25, 1936

2,031,769

UNITED STATES PATENT OFFICE 2,031,769

KITCHEN UTILITY DEVICE

Alfred C. Gilbert, North Haven, and Arthur A. Arnold, New Haven, Conn., assignors to The A. C. Gilbert Company, New Haven, Conn.

Application November 25, 1932, Serial No. 644,293

8 Claims. (Cl. 259—84)

This invention relates to kitchen utility devices of the type wherein an electric motor supplies power for various operations such as mixing, beating, extracting fruit juices, etc.

One of the objects of our invention is to provide a device of this kind which, while relatively inexpensive, has a wide range of use and is sturdy and rugged.

Another object is to furnish an improved device for the agitation or mixing of liquids or semisolids which will satisfactorily perform such operations as beating eggs or batters, mixing beverages, extracting orange juice, chopping meat, sharpening knives, grinding coffee and cracking ice cubes.

Another object is to furnish a kitchen mixer having a conveniently arranged and effectively driven power shaft having the necessary power for chopping meat, breaking ice cubes, grinding coffee, and similar operations, the arrangement being such that these operations can be carried on with little effort and with maximum convenience on the part of the housewife.

Another object is to furnish a compact, strong and rugged device having ample power for the various operations and which, nevertheless, can be sold at a popular price.

To these and other ends the invention consists in the novel features and combinations of parts to be hereinafter described and finally pointed out in the claims.

In the accompanying drawings:

Fig. 1 is an elevation of our device showing it as arranged for mixing material in a large bowl, but showing, also, the juice extracting parts mounted in position at the upper part of the structure;

Fig. 3 is a top plan view of the device shown in Fig. 1 but with the juice extractor bowl and reamer omitted;

Fig. 4 is an enlarged section on line 4—4 of Fig. 2;

Fig. 5 is an enlarged section on line 5—5 of Fig. 3;

Fig. 6 is an enlarged section on line 6—6 of Fig. 1;

Fig. 7 is an enlarged section on line 7—7 of Fig. 2;

Fig. 8 is a plan view partly in section of the bracket serving as a mounting for the depending agitator shafts;

Fig. 9 is an enlarged section on line 9—9 of Fig. 1;

Fig. 12 is an elevation of the entire device showing it as used for the delivery of extracted juice into a small bowl;

Fig. 12A is a detail underneath view of the bowl holder shown in Fig. 12;

Fig. 13 is a detail view showing the motor bracket tipped upwardly;

Fig. 14 is a section on line 14—14 of Fig. 12;

Fig. 14A is a detail transverse section of the motor bracket looking in a rearward direction;

Fig. 15 is an elevation showing the manner of mounting the coffee grinder;

Fig. 16 is an enlarged section on line 16—16 of Fig. 15;

Fig. 17 shows an ice cube breaker mounted in position in the power outlet;

Fig. 18 shows a food chopper mounted in position in the power outlet;

Fig. 19 shows a cutlery sharpening wheel mounted in operative position on the rear end of the motor shaft; and Figs. 20 and 21 show a modified form of device for holding the agitator shafts removably in position in their bracket, Fig. 21 being a section on line 21—21 of Fig. 20.

Figure 2:
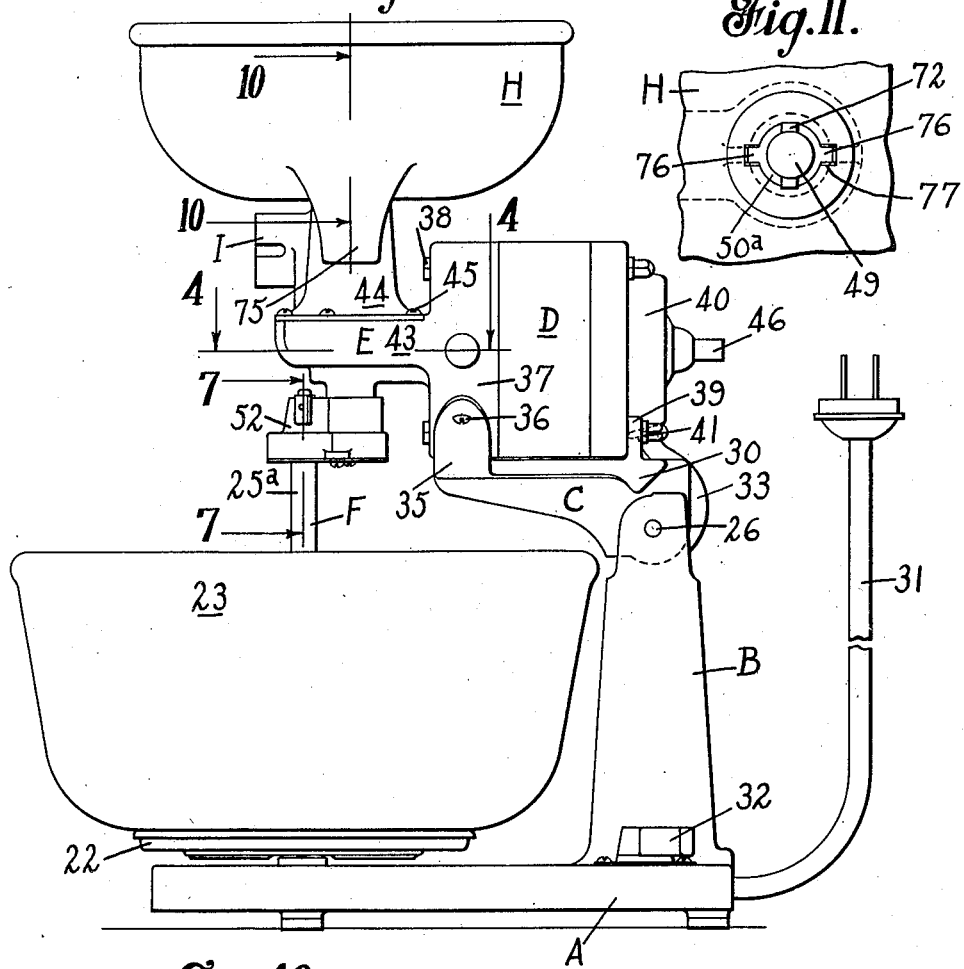
Fig. 2 is an elevation at right angles to Fig. 1.

In its general features our device, as particularly illustrated herein, comprises a base adapted to support bowls of different diameters; a pedestal rising from the base; a bracket pivoted to the pedestal in a position to overhang the base; an electric motor supported on top of the bracket; a gear case and gearing supported from one end of the motor; agitator shafts depending from the gear case, and adapted to project down into a receptacle supported on the base, to stir the contents of the receptacle; an extractor shaft projecting upwardly from the gear case and adapted to drive a reamer located in a juice collecting and delivering bowl; and a power outlet socket associated with the gearing and adapted for the connection of various devices to be driven at relatively low speed, such as a food chopper, an ice cube breaker and the like.

In the example selected for illustration, the base is indicated generally at A, the pedestal at B, the motor bracket at C, the motor at D, the gear case containing gearing driven from the motor shaft at E, the depending agitators at F, the fruit reamer at G, the juice collecting bowl at H, and the power socket at I.

The base A is of the usual form and need not be particularly described. It is adapted to support a number of different receptacles and in Figs. 1 and 2 it is shown as detachably holding in place a rotating turntable 22 on which is supported a large bowl 23 having its center located midway between the beaters or blades on the lower ends of the agitators F. The pedestal B rises from what may be termed the rear end of the base A and is forked at its upper end to receive the motor bracket C. The side members of the pedestal fork are perforated to receive a pivot pin 26 by means of which the bracket C is pivoted to swing in a vertical plane. When the bracket is swung upwardly the agitators are moved up out of the receptacle. Adjustment of the agitators vertically with respect to the bottom of the receptacle is permitted by the provision of a stop screw 27, shown in detail in Figs. 13 and 14, said screw projecting down from the motor bracket slightly in front of the pivot and adapted to contact with an upwardly facing abutment 28 in the forked end of the pedestal. After adjustment the set screw 27 is held in the adjusted position by a clamping nut 29. When the bracket and the parts carried thereby are tilted upwardly to the position shown in Fig. 13 the agitators will clear the bowl or receptacle 23 and permit the latter to be withdrawn laterally, but before the bowl is withdrawn any material dripping from the agitators will drip down into said bowl. Tilting movement beyond the position shown in Fig. 3 is prevented by a stop member 30 on the bracket, which stop member may advantageously be formed as an integral part of the bracket adapted to abut the upper surface of one arm or tine of the pedestal fork, as shown in Fig. 13. An electric conductor 31 passes laterally into the base A at the rear end thereof and to a rheostat, not shown, within the base controlled by a rheostat lever 32, and an electric conductor 33 passes upwardly from the base through the pedestal B, which is made hollow for that purpose, and from the pedestal to the motor. To receive the conductor 33 in a region where it passes upwardly out of the hollow pedestal, the bracket C is provided on its rear surface with a vertical groove 34. The flexibility of the conductor permits the bracket to be swung from the position of Fig. 14 to the position of Fig. 13 without difficulty.

The motor bracket C is preferably formed as a cradle at the upper part thereof so as to receive and conform to the lower part of the motor D, to which motor the bracket is secured. At its front end the bracket has a cradle fork whose arms 35 are secured to the front end shell of the motor by screws 36 or the like. The arms 35 engage the cylindrical side surface of a motor shell member 37 that is secured by bolts, having nuts 38, to the end of the motor structure. At its rear end the bracket has arms 39 forming a fork to hold the motor at its rear end, these arms 39 being preferably secured to the rear end shell 40 of the motor by bolts, having nuts 41. The end shell 40 is preferably shouldered about midway between its ends, and the arms 39 abut the shouldered surface, which is a vertical surface at the rear end portion of the motor. In practice the same bolts which secure the cradle arms 39 to the motor hold the end shells 37 and 40 of the motor in position. One of these bolts is shown in Fig. 1 at 42, a nut 38 being applied to the front end of the bolt and said bolt extending rearwardly entirely through the motor shell and having one of the nuts 41 on the rear end thereof.

The gear case E is preferably formed in part integrally with the motor end shell 37. The end shell 37 is preferably made as a die casting and it has a forwardly projecting generally rectangular and flattened gear housing member 43 formed as a part thereof. This member 43 is generally or approximately rectangular in plan, as shown in Fig. 4, and it extends across the motor end shell approximately diametrically thereof, as best shown in Fig. 1. To the top of this gear housing member 43 is applied another member 44, which also may be a die casting and which constitutes a cap or cover for the gear case. Member 44 is preferably secured to member 43 by screws 45. It will be noted that the shaft 46 of motor D extends into the gear casing, as shown in Fig. 4. This shaft is horizontally arranged and has pinned to it within the gear casing a worm 47 engaging a worm wheel or spiral gear 48 horizontally disposed in the gear casing and pinned to a vertical shaft 49 having a bearing 50 formed as a part of cap member 44 and having a bearing 51 formed as a part of the housing 43. The bearing 50 projects upwardly from the gear case and the bearing 51 projects downwardly therefrom, as best shown in Fig. 5. The motor shaft through the worm 47 and gear 48 drives the vertical shaft 49. A small gear case 52 is applied to the main gear case at the lower part thereof and is adapted to receive gears through which the duplex agitators F are rotated. Preferably the small gear case 52 has a sleeve 53 surrounding the bearing 51, as shown in Fig. 5, and secured thereto by a screw 54. On the lower end of shaft 49 is applied a spur gear 55 that is made fast on said shaft by screw 56. The lower extremity of shaft 49 has a squared portion 57 fitting in a squared socket in the upper face of gear 55. Gear 55 meshes with a similar gear 58 in the gear case 52, and gear 58 meshes with and drives a similar gear 59. The gears 58 and 59 are located in the lower part of case 52, as shown in Fig. 7, and are adapted to drive the agitator spindles 25$^a$ and 25$^b$, respectively. These spindles are provided at their lower ends with circular agitating blades 60. The gears 58 and 59 are fixed on the lower ends of sleeves 61, 62, respectively, that are mounted in the small gear case 52 to rotate therein, said case having suitable bearings for said sleeves. The sleeves 61, 62 are introduced into the gear case from the top, and the gears 58 and 59 are introduced into the case from the bottom, and then each sleeve is suitably swaged into its gear so that the sleeve will rotate with the gear and the former will constitute a hub member for the latter. Each of the gears 58 and 59 has a square socket 63 therein adapted to be engaged by a squared portion 64 with which each of the agitator shafts 25$^a$ and 25$^b$ is provided in order that the agitator shaft may have nonrotative engagement with the gear so as to be driven by the same. At the upper extremity of each of the shafts 25$^a$ and 25$^b$ is a reduced cylindrical portion 65 adapted to be received in either one of the sleeves 61, 62 in a correspondingly shaped bore thereof, and means are provided for securing each agitator shaft removably in place when the upper end thereof is placed in operative relation to the corresponding driving gear. In the form shown in Fig. 7, each portion 65 of the agitator shaft has an annular groove 66 near the upper end thereof adapted to be engaged by a locking member 67. This locking member may be formed as a clip swiveled intermediate of its ends on a screw 68 engaging the upper end of the gear case 52, as shown in Fig. 7, said clip having notched portions 69 therein adapted to engage the respective grooves 66 to lock the agitators in position in the gear case. The clip 67 may advantageously be made of sheet metal and at its ends it may be provided with bent-up finger pieces 70 by means of which it may be conveniently manipulated. Fig. 8 shows this locking member in its engaged position, and it will be obvious that if said member is turned on its pivot in a clockwise direction its notched portions will disengage the grooved portions of the agitator shafts and release said shafts, which will then drop down out of the gear case 52. In this manner the agitator shafts can be readily removed.

Preferably the agitator shafts 25ª, 25ᵇ are at a slight angle to each other so as to diverge in a downward direction, as shown in Fig. 7. This gives the two agitators when used in conjunction a greater scope of movement in the mass or body of liquid.

It will be obvious that either or both of the agitators 25ª, 25ᵇ can be used as desired and that the agitators are interchangeable in the sockets of the driving gears 58, 59. If either one of the agitators be removed the gear to which it corresponds remains in position and is rotated by or from the gear 55. If the agitator having a position corresponding to gear 58 in Fig. 6 be removed, the remaining agitator having a position corresponding to gear 59 will still be driven, inasmuch as gear 58 will remain in position to transmit motion from gear 55 to gear 59. In mixing beverages it is usually advisable to employ only one of the agitators. This agitator, disposed at a slight angle to the vertical, will act well in stirring or agitating the contents of a narrow elongated beverage receptacle resting on the base.

The fact that the sockets in the gears 58, 59 and the corresponding projections on the agitator shafts are square is of advantage in that each agitator shaft may be operatively engaged with its driving element in any of four different angular positions. This makes the attachment of the agitator shafts to the gears more convenient than it would be otherwise.

Figure 11:
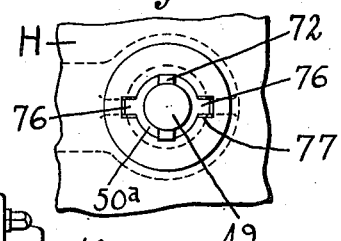
Fig. 11 is a detail plan view of a portion of the juice extractor bowl and adjacent parts showing a means for preventing rotation of the bowl when in the operative position.
Figure 10:
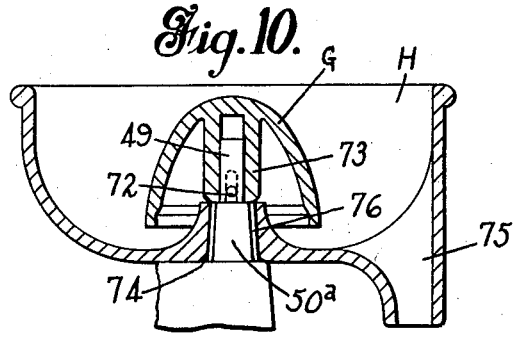
Fig. 10 is a detail section on line 10—10 of Fig. 2.

The upper portion of the vertical shaft 49 serves to drive the juice extracting device and for this purpose the shaft projects upwardly beyond bearing 50 to engage the reamer G. Just above the bearing 50 shaft 49 is provided with a transversely disposed projecting pin 72 adapted to engage in the usual manner the transversely notched lower end of a depending sleeve 73 formed as an integral part of the reamer. The upwardly projecting part of the upper bearing 50 for shaft 49 serves the additional function of centering the juice extractor bowl H, previously referred to. For this purpose the outer surface of the upwardly projecting portion of the bearing is slightly tapered, as shown at 50ª, to engage a correspondingly shaped recess in the bottom of the bowl H. In the assembled position the bottom of the bowl near the center thereof rests on a portion 74 of the casing member 44. At one side thereof the bowl H is provided with a discharge spout 75. In the preferred arrangement the bowl H when assembled on the mixing device is held in a position in which the spout 75 is directed to one side or the other of the base A. For this purpose the upwardly projecting portion of bearing 50 is provided with diametrically located ribs 76 on the sides thereof, which engage corresponding grooves 77 in the bottom opening of the bowl. Thus the bowl may be readily placed and held in the position shown in Figs. 1 and 2, or in the position in which the bowl has been turned on a vertical axis through 180°. The first-mentioned position is usually preferred because by reason of the fact that the shaft 49 is at one side of the center of the gear casing there is greater clearance for the juice discharging spout in that position, the spout being spaced laterally at some distance from the gear casing and motor, as shown particularly in Fig. 1. By providing interlocking engagement between the bowl and the gear housing, as above described, the bowl is maintained in its proper position and prevented from moving out of that position under the effects of vibration while the device is in use, although when it is desired to remove the bowl for cleansing this may readily be done inasmuch as it is only necessary to remove the reamer from the upper end of the drive shaft and then lift the bowl off of the top of the gear housing, which top acts as a seat therefor. Manifestly it is not always necessary to use projecting ribs on the gear housing engaging grooves in the aperture in the bottom of the bowl, as other provisions for locking the bowl against lateral displacement may be furnished as a substitute for the means particularly shown in Figs. 10 and 11.

Whereas the motor shaft 46 will rotate at from, say, 11,000 to 12,000 R. P. M., the gearing shown and described will cause the extractor shaft to rotate at between, say, 1100 and 1200 R. P. M., which is a satisfactory speed for driving the juice extracting reamer. In the particular case shown the agitator shafts 25ª, 25ᵇ rotate at the same speed, as the gears 58 and 59 have the same number of teeth as the gear 55, but obviously a variation may be made in this respect if desired.

It is very desirable to provide a slowly driven power shaft having ample power for carrying out such operations as chopping meat or other food, breaking ice cubes, etc., and this we do. We provide a power shaft geared down so that it rotates at a speed of, say, from 33 to 35 R. P. M., and, furthermore, we locate this power shaft so that the devices to be driven thereby can be used by the housewife with a maximum of convenience. For this purpose we dispose the power shaft preferably in a location somewhat to one side of the shaft 49 and somewhat above the motor shaft, and we have the socket I for the application of the various devices to be driven by said shaft arranged so that it faces forwardly from the gear housing, as shown particularly in Fig. 1. The power shaft is preferably horizontal and substantially parallel with the motor shaft and preferably located in substantially the same vertical plane as the motor shaft somewhat above the latter. This power shaft is shown at 78 and it will be seen from Fig. 9 that it is a short shaft having bearings 79, 80 respectively in the rear and front walls of the gear housing member 44. Pinned to this shaft in the space between the bearings is a worm gear 81 engaging a worm 82 pinned to the shaft 49 at a point immediately below bearing 50, as shown in Fig. 5. By driving the power shaft 78 from shaft 49 by means of a worm on the latter shaft engaging a worm gear on the power shaft, the power shaft may have the necessary reduction in speed for the purposes in view. The power socket I, previously referred to, is preferably formed integral with the front wall of housing member 44 and is of cylindrical shape, being formed by a relatively large sleeve into which projects a head 83 formed integral with shaft 78 at the end thereof and provided with a diametrically disposed slot 84. In the wall of the power socket sleeve is a longitudinally disposed notch 85, and in the wall of the sleeve at a point substantially opposite notch 85 there is provided a clamping screw 86 having a knurled head and a threaded shank extending through a threaded opening 87 in the wall of the power socket sleeve. By this construction shaft 78 may be removably coupled to the shafts of various attachments, including those shown in Figs. 15, 17 and 18. In Figs. 15 and 16 we have shown a coffee grinder J secured to the power outlet. In this case the slot 84 in the head of the shaft is engaged by a tenon 88 on the end of the coffee grinder shaft 89. This shaft 89 is mounted within in a sleeve 90 adapted to fit into the power socket sleeve. A pin 91 projecting laterally from sleeve 90 enters notch 85 and thus prevents rotational displacement of the coffee grinding attachment, while clamping screw 86 has its inner end arranged to engage the sleeve 90 in order to prevent endwise dislocation of the parts. It will be understood that the ice cube breaker K shown in Fig. 17 and the food chopper L shown in Fig. 18 may be attached to the power socket and drivingly connected with the power shaft in substantially the same manner as the coffee grinder J. We make no claims herein to the particular structure of any of the devices J, K, L, and it may be noted that a number of other devices may be successfully used in connection with the power socket. The convenience of location of the power socket in our device is a matter of considerable importance.

In Figs. 12 and 12A we have shown an attachment which may be used if desired in connection with the operation of extracting orange juice. This attachment consists of a holder which may be positioned on the base A and which serves the purpose of holding in position beneath the delivery spout of the juice-delivering bowl H a juice-receiving receptacle. This juice-receiving receptacle may conveniently take the form of a small glass bowl M. This bowl is adapted to be used and held in a socketed holder 92 of metal shaped to embrace and conform to the lower portion of the juice-receiving receptacle. Projecting downwardly from the bottom of holder 92 is a hub 93 having a transverse perforation 94 therein through which passes the laterally bent end portion 95 of a supporting rod 96. The holder 92 is attached to portion 95 of the rod 96 by a clamping screw 97. At the lower end of rod 96 is a cylindrical projection 98 adapted to engage a correspondingly shaped socket in base A, and above projection 98 is a flange 99 adapted to rest on the upper surface of the base. When projection 98 is placed in the socket in the base it will be maintained in a substantially upright position, and by adjusting the holder 92 lengthwise of portion 95 of rod 96 the juice-receiving receptacle may be placed in the desired location laterally with relation to the discharge spout of the delivery bowl H. There is thus provided a convenient means for positioning a receptacle adjacent the bowl delivering spout while the operation of extracting juice from oranges is progressing. By supporting receptacle M close to the spout of receptacle H, spattering of juice being delivered by the delivery bowl is effectively prevented.

It will be observed from Figs. 2 and 3 that the motor shaft 46 is extended rearwardly so as to project out of and beyond the motor. This permits said shaft to be usefully employed for purposes such as sharpening cutlery. It will be noted that the rearwardly projecting end of the motor shaft is substantially unobstructed so that ready access may be had thereto. To the end of the shaft may be attached the cutlery sharpening device N shown in detail in Fig. 19. It will be noted that the rearwardly projecting part of shaft 46 is of comparatively large diameter and provided with an interiorly threaded socket 46$^a$ open at the end of the shaft. The sharpening device N includes in its structure a metal sleeve 100 having a cylindrical socket 101 in the end thereof shaped to closely fit over shaft 46, and to conform to a considerable portion of the cylindrical surface of said shaft. Within the sleeve 100 and rigid therewith is a central threaded shank 102. This shank 102 has threads which engage the interior threads of shaft 46 so that the sleeve 100 can be screwed on to the end of the shaft until the extremity of the shaft abuts against the bottom of the sleeve or tool socket. The sleeve 100 is rigidly attached in a suitable manner to a grinding wheel 103 made of suitable abrasive material. A mating wheel 103$^a$ is pressed against wheel 103 by a spring 103$^b$ and between the wheels is a groove 104. At the rear face of grinding wheel 103$^a$ there may be provided a scissors-sharpening cone 105 of metal or other suitable material. In the operation of sharpening a knife it is advisable to start grinding or sharpening of the blade at a point near the handle and to pull the knife toward the operator while the edge of the knife engages the groove 104. It is best to hold the knife horizontally with its edge uppermost and engaging the lower surface of the double wheel so as to pull the knife toward the operator during the operation of grinding. In sharpening scissors the shear blade is placed against the conical collar 105, with the edge of the blade disposed toward the grinding wheel, and by pulling the blade toward the operator the edge will be sharpened.

In the particular case shown the threads of the shank 102 and shaft 46 are ordinary right-hand threads so that the sharpening attachment can be applied to the motor shaft by placing the attachment on the shaft and then rotating the attachment in a clockwise direction until it is firmly seated on the shaft, as previously described. In this particular instance, also, the rotation of the motor shaft is counterclockwise, as indicated by the arrow on Fig. 19, so that when the sharpening device is in use there is a tendency for it to be more firmly rather than less firmly engaged with the motor shaft as the shaft rotates. It is important to note that the sleeve on the attachment end which embraces the end of the motor shaft forms a bearing on the sleeve that gives the attachment very effective support. Other devices than a cutlery sharpener can be supported on the shaft in this manner without departure from the principle involved.

In Figs. 20 and 21 we have shown a modified form of device for locking the agitator shafts in position as they are thrust into their sockets. In this case each of the agitator shafts 25$^c$, 25$^d$ has an annular groove 106 near the upper end thereof adapted to be engaged by a ball 107 in such a manner as to hold the shaft in place in its socket. The ball 107 may advantageously be pressed into groove 106 yieldingly by a curved spring member 108 embracing the socket. The spring member 108 is not completely circular and is held in place by a dent 109 therein yieldingly engaged with a small depression 110 formed by indenting the wall of sleeve member 111 at the exterior thereof. As the agitator shaft is forced into its socket the end portion 112 of the shaft engages ball 107 to press it out of the way and the ball then snaps back into the groove 106 to retain the shaft yieldingly in the assembled position.

In the construction described the gearing for driving the vertical shaft 49 and the horizontal power shaft 78 is very efficient. Furthermore, shaft 49 has a thrust bearing 49ª located below worm gear 48 which enables the shaft to be satisfactorily used for juice extracting purposes, and motor shaft 46 has a thrust bearing 46ª interposed between worm 47 and projection 46ᵇ on the gear housing so as to enable the motor shaft to withstand the end thrust developed by the operation of the worm gearing. The gear housing can be readily packed with grease and this will take care of the lubrication of the gearing for a considerable length of time.

We have not attempted to illustrate or describe herein the various modifications of the structure of our kitchen utility device which may be made without departing from the principles of our invention. Many changes may be made without digressing from our inventive idea as expressed in the claims.

What we claim is:

1. In a kitchen utility device, the combination of a base, a pedestal rising therefrom, a bracket pivoted to the pedestal, a motor on the bracket and having a horizontally arranged shaft, a gear housing carried by the motor casing and extending across one end of the motor casing in a position to overhang the base, gears in said housing driven from the motor shaft, a vertical shaft in the gear housing driven by said gears and having a bearing depending from the gear housing, a second gear housing surrounding said bearing and secured thereto, intermeshing agitator shaft gears in said second gear housing, agitator shafts depending from said gears, and a gear member on the lower end of said vertical shaft and within said second gear housing meshing with one of the agitator shaft gears to drive the same.

2. In a device such as described, the combination of an electric motor having a horizontal shaft, a casing for said motor, a gear housing carried by said casing and extending across one end thereof, a horizontally arranged power shaft in said housing in laterally spaced relation to the motor shaft, a vertical shaft journaled in said gear housing, a worm on said motor shaft meshing with a worm gear on said vertical shaft, a worm on said vertical shaft meshing with a worm gear on said power shaft, and two depending agitator shafts driven from the lower end of said vertical shaft.

3. In a device such as described, the combination of an electric motor having a horizontal shaft, a casing for said motor, a gear housing carried by said casing and extending across one end thereof, a horizontally arranged power shaft in said housing in laterally spaced relation to the motor shaft, a vertical shaft journaled in said gear housing, a worm on said motor shaft meshing with a worm gear on said vertical shaft, a worm on said vertical shaft meshing with a worm gear on said power shaft, two depending agitator shafts driven from the lower end of said vertical shaft, a reamer attached to the upper end of the vertical shaft to be driven thereby, and a juice-collecting bowl enclosing the reamer and resting on the top of the gear housing.

4. In a kitchen utility device, the combination of a horizontally arranged motor, a gear housing carried by the motor at one end thereof, gears located side by side in the lower part of said gear housing, agitator shafts depending from the respective gears, means for driving said gears from the motor shaft, said gears having square sockets therein, square portions on the agitator shafts adapted to fit said sockets, means for holding said square portions in said sockets, said means including cylindrical portions on the upper ends of the agitator shafts above the square portions, said cylindrical portions having annular grooves, and means adapted to enter said grooves for holding the agitator shafts against vertical displacement.

5. In a kitchen utility device, the combination of a base, a motor supported above the base, a vertical shaft gear housing adjacent the motor, a vertical shaft journaled in the gear housing, means for driving said shaft from the motor shaft, said vertical shaft extending at its lower end out of the gear housing, a second gear housing secured to the first adjacent the lower end of said vertical shaft, a gear carried by the lower end portion of said vertical shaft within said second gear housing, additional gears enclosed by and having hollow bearing hubs within said second gear housing, one of which gears is driven from the first-mentioned gear and the other of which is driven by the gear just mentioned, and depending agitator shafts whose upper ends are insertable into and quick-detachably connected with the respective last-mentioned gears.

6. In a household mixer, the combination of a horizontally arranged motor, a gear housing carried by the motor at one end thereof, gears located side by side in the lower part of said gear housing, agitator shafts depending from the respective gears, means for driving said gears from the motor shaft, said gears having non-circular sockets therein, non-circular portions on the agitator shafts adapted to fit said sockets, and means for holding said agitator shafts in quick-detachable driving relation to said gears, said means including annularly grooved extensions on the upper ends of the agitator shafts above the non-circular portions of said shafts, and yieldingly mounted retaining devices cooperating with said extensions.

7. In a device such as described, the combination of an electric motor having a horizontal shaft, a casing for said motor, a gear housing carried by said casing and extending across one end thereof, a horizontally arranged power shaft parallel to and laterally spaced from the motor shaft, a vertical shaft journaled in said gear housing, a worm on said motor shaft meshing with a worm gear on said vertical shaft, a worm on said vertical shaft meshing with a worm gear on said power shaft, and two depending agitator shafts driven from the lower end of said vertical shaft.

8. In a device such as described, the combination of an electric motor having a shaft, a casing for said motor, a gear housing carried by said casing and extending across one end thereof, a horizontally arranged power shaft in said housing spaced from and adjacent to the motor shaft, a vertical shaft journaled in said gear housing, a gear on the motor shaft meshing with a gear on said vertical shaft, a worm on said vertical shaft meshing with a worm gear on said power shaft, and an agitator shaft depending from said housing and driven from the lower end of the vertical shaft.

ALFRED C. GILBERT.
ARTHUR A. ARNOLD.